United States Patent
Mohammad et al.

(10) Patent No.: US 11,076,715 B1
(45) Date of Patent: Aug. 3, 2021

(54) COFFEE MACHINE WITH DYNAMIC FLOW AND TEMPERATURE CONTROL

(71) Applicant: Nuli Coffee, Inc., Hillsboro, OR (US)

(72) Inventors: Ali H Mohammad, Hillsboro, OR (US); Ethan Miller, Medford, MA (US)

(73) Assignee: Nuli Coffee, Inc., Hillsboro, OR (US)

(*) Notice: Subject to any disclaimer, the term of this patent is extended or adjusted under 35 U.S.C. 154(b) by 0 days.

(21) Appl. No.: 17/084,664

(22) Filed: Oct. 30, 2020

(51) Int. Cl.
| | |
|---|---|
| *A47J 31/00* | (2006.01) |
| *A47J 31/52* | (2006.01) |
| *A47J 31/46* | (2006.01) |
| *A47J 31/56* | (2006.01) |
| *A47J 31/34* | (2006.01) |
| *A47J 31/10* | (2006.01) |
| *A47J 31/44* | (2006.01) |
| *A47J 31/36* | (2006.01) |

(52) U.S. Cl.
CPC .......... *A47J 31/5253* (2018.08); *A47J 31/10* (2013.01); *A47J 31/34* (2013.01); *A47J 31/4467* (2013.01); *A47J 31/468* (2018.08); *A47J 31/521* (2018.08); *A47J 31/5251* (2018.08); *A47J 31/5255* (2018.08); *A47J 31/56* (2013.01); *A47J 31/36* (2013.01); *A47J 31/469* (2018.08); *A47J 2202/00* (2013.01)

(58) Field of Classification Search
CPC .......... A47J 31/36; A47J 31/32; A47J 31/468; A47J 31/469; A47J 31/525; A47J 31/5251; A47J 31/5253; A47J 31/5255; A47J 31/542

USPC .............. 99/281, 282, 283, 302 R
See application file for complete search history.

(56) References Cited

U.S. PATENT DOCUMENTS

| | | | | |
|---|---|---|---|---|
| 2013/0298776 A1* | 11/2013 | Mulder | ............... | A47J 31/5255 99/283 |
| 2014/0331868 A1* | 11/2014 | Novak | ............... | B01F 3/04248 99/323.2 |
| 2015/0059585 A1* | 3/2015 | Kim | ............... | A47J 31/469 99/283 |
| 2015/0230655 A1* | 8/2015 | Hoog | ............... | A47J 31/0576 426/231 |
| 2020/0093323 A1* | 3/2020 | Dionisio | ............... | A47J 31/56 |
| 2020/0367689 A1* | 11/2020 | Illy | ............... | A47J 31/5251 |

* cited by examiner

*Primary Examiner* — Reginald Alexander
(74) *Attorney, Agent, or Firm* — Georgiy L. Khayet

(57) ABSTRACT

A coffee machine is provided. The coffee machine may include an electronic control module configured to receive at least one flow set point and at least one temperature set point. The coffee machine may further include a portafilter, a group head configured to receive the portafilter, and at least one water line configured to supply water. The coffee machine may further include at least one syringe pump configured to pressurize the water to attain the at least one flow set point. The coffee machine may further include an in-line heating element configured to control temperature of the water according to the at least one temperature set point. The coffee machine may further include a feedback loop configured to provide the temperature to the electronic control module to enable selectively adjusting the temperature.

20 Claims, 12 Drawing Sheets

900

```
┌─────────────────────────────────────────────────────────────┐
│ PROVIDE AN ELECTRONIC CONTROL MODULE TO RECEIVE BREWING     │
│ SETTINGS INCLUDING AT LEAST ONE FLOW SET POINT AND AT LEAST │
│           ONE TEMPERATURE SET POINT                         │
│                        905                                  │
└─────────────────────────────────────────────────────────────┘
                              ↓
┌─────────────────────────────────────────────────────────────┐
│      PROVIDE A PORTAFILTER CONFIGURED TO HOLD COFFEE        │
│                        910                                  │
└─────────────────────────────────────────────────────────────┘
                              ↓
┌─────────────────────────────────────────────────────────────┐
│   PROVIDE A GROUP HEAD CONFIGURED TO RECEIVE THE PORTAFILTER│
│                        915                                  │
└─────────────────────────────────────────────────────────────┘
                              ↓
┌─────────────────────────────────────────────────────────────┐
│     PROVIDE AT LEAST ONE WATER LINE CONFIGURED TO SUPPLY WATER│
│                        920                                  │
└─────────────────────────────────────────────────────────────┘
                              ↓
┌─────────────────────────────────────────────────────────────┐
│ PROVIDE AT LEAST ONE SYRINGE PUMP CONFIGURED TO PRESSURIZE  │
│    THE WATER TO ATTAIN THE AT LEAST ONE FLOW SET POINT      │
│                        925                                  │
└─────────────────────────────────────────────────────────────┘
                              ↓
┌─────────────────────────────────────────────────────────────┐
│ PROVIDE AN IN-LINE HEATING ELEMENT CONFIGURED TO CONTROL    │
│ TEMPERATURE OF WATER DURING AN EXTRACTION PROCESS           │
│ ACCORDING TO AT LEAST ONE TEMPERATURE SET POINT             │
│                        930                                  │
└─────────────────────────────────────────────────────────────┘
                              ↓
┌─────────────────────────────────────────────────────────────┐
│ PROVIDE A FEEDBACK LOOP CONFIGURED TO REPORT THE            │
│ TEMPERATURE TO THE ELECTRONIC CONTROL MODULE, THE           │
│ ELECTRONIC CONTROL MODULE BEING FURTHER CONFIGURED TO       │
│ SELECTIVELY ADJUST THE TEMPERATURE BASED ON THE BREWING     │
│                       SETTINGS                              │
│                        935                                  │
└─────────────────────────────────────────────────────────────┘
```

FIG. 9

COFFEE MACHINE WITH DYNAMIC FLOW AND TEMPERATURE CONTROL

TECHNICAL FIELD

The present disclosure relates generally to coffee machines and, more particularly, to coffee machines with dynamic flow and temperature control.

BACKGROUND

Semi-automatic coffee machines, such as the Faema E61, La Marzocco Linea, Nuova Simonelli Aurelia, and Astoria Sabrina, traditionally delivered water to a brewing chamber at a fixed pressure, for example, of nine bars. Coffee machines, as originally developed and commercialized, contained a boiler that heated water and a fixed-pressure pump that forced heated water out of the boiler into a brewing chamber that contained ground coffee. The temperature of the brewing water was controlled by a thermostat ("bang-bang") or a pressurestat controller which maintained a water temperature to within 5-10° C. of a set point. However, coffee flavor can be overly sensitive to the temperature of brewing water and require lower temperature variations. Therefore, using a boiler with a temperature range of 5-10 degrees can result in an inferior brew. Additionally, flavor and taste of a coffee beverage depends on a combination of parameters such as a coffee amount, water amount, grind settings, beverage volume, and water pressure.

Recently, the use of a Proportional Integral Derivative ("PID") controller has emerged as a standard for temperature control for brewing devices. A PID controller can be integrated within traditional machines via aftermarket kits or in revised designs that replace the (often mechanical) thermostat/pressurestat with an electrical circuit to maintain temperature typically within 0.5-1.0° C. of a set point. This increased control has yielded improvements in consistency and flavor and have become a de facto standard.

In other applications, various in-line or on-demand heaters are used to eliminate the need for reservoirs of heated water whose temperature must be maintained even when water is not being drawn by the device. This makes it possible for devices with high throughput to maintain a smaller footprint and to eliminate the need to maintain heated reservoirs. Advancements in temperature control have made this possible for non-pressurized coffee brewing ("drip" coffee) and have been commercialized by the Luminaire Bravo and other existing coffee makers.

In-line heaters cannot practically be used for fixed-pressure systems because the flow rate of water is unknown and unpredictable and contemporary commoditized flow measurement devices do not provide the necessary precision to dynamically heat brewing water to the tolerances required for high-grade espresso.

Traditional coffee machines have boilers. A substantial cost in the manufacture, footprint, and maintenance of the traditional coffee machines is due to the requirement of a boiler that can withstand both the temperature and pressure of brewing water.

Traditional coffee machines have a pump that provides fixed pressure. However, because the pressure is fixed, the flow rate depends on the resistance of the coffee. Thus, if coffee provides considerable resistance, the flow rate decreases. Vice versa, if the coffee provides little resistance, the flow rate increases. Thus, maintaining constant flow rate or even predicting the flow rate in the traditional coffee machines is difficult. Furthermore, to maintain the temperature, traditional coffee machines use large boilers. However, with large boilers, the temperature of water cannot be dynamically varied during the extraction process because it takes a long time and large amounts of energy to change the temperature of water in large water boilers by just a few degrees, whereas the extraction typically takes a short time.

One way to control the flow rate in a traditional coffee machine is to vary the coffee puck, for example, by changing the grind, dose, or force used in tamping. This approach to controlling the flow rate is indirect and difficult to implement even with high degrees of skill.

Furthermore, temperature and pressure of water in a boiler tends to increase the chemical activity of the water, which can result in rust and lime depositions inside the boiler.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are a coffee machine and a methods for manufacturing a coffee machine. According to one example embodiment, a coffee machine may include an electronic control module configured to receive brewing settings. The brewing settings may include at least one flow set point and at least one temperature set point. The coffee machine may further include a portafilter configured to hold coffee, a group head configured to receive the portafilter, and at least one water line configured to supply water.

The coffee machine may further include at least one syringe pump configured to pressurize the water based on predetermined criteria. The coffee machine may further include an in-line heating element configured to control a temperature of the water according to the at least one temperature set point during an extraction process. The coffee machine may further include a feedback loop configured to provide the temperature to the electronic control module. The electronic control module may be further configured to selectively adjust the temperature based on the brewing settings.

According to another example embodiment, a method for manufacturing a coffee machine is provided. The method may commence with providing an electronic control module. The electronic control module may be configured to receive brewing settings. The brewing settings may include at least one flow set point and at least one temperature set point. The method may further include providing a portafilter configured to hold coffee. The method may then continue with providing a group head configured to receive the portafilter. The method may further include providing at least one water line configured to supply water.

The method may then continue with providing at least one syringe pump. The at least one syringe pump may be configured to pressurize the water based on predetermined criteria to attain the at least one flow set point. The method may then continue with providing an in-line heating element. The in-line heating element may be configured to control temperature of the water according to the at least one temperature set point during an extraction process. The method may further include a feedback loop to provide the temperature back to the electronic control module. The electronic control module may be further configured to selectively adjust the temperature based on the brewing settings.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

FIG. 9 is a flow chart of an example method for manufacturing a coffee machine, according to some example embodiments.

DETAILED DESCRIPTION

Figure 1:
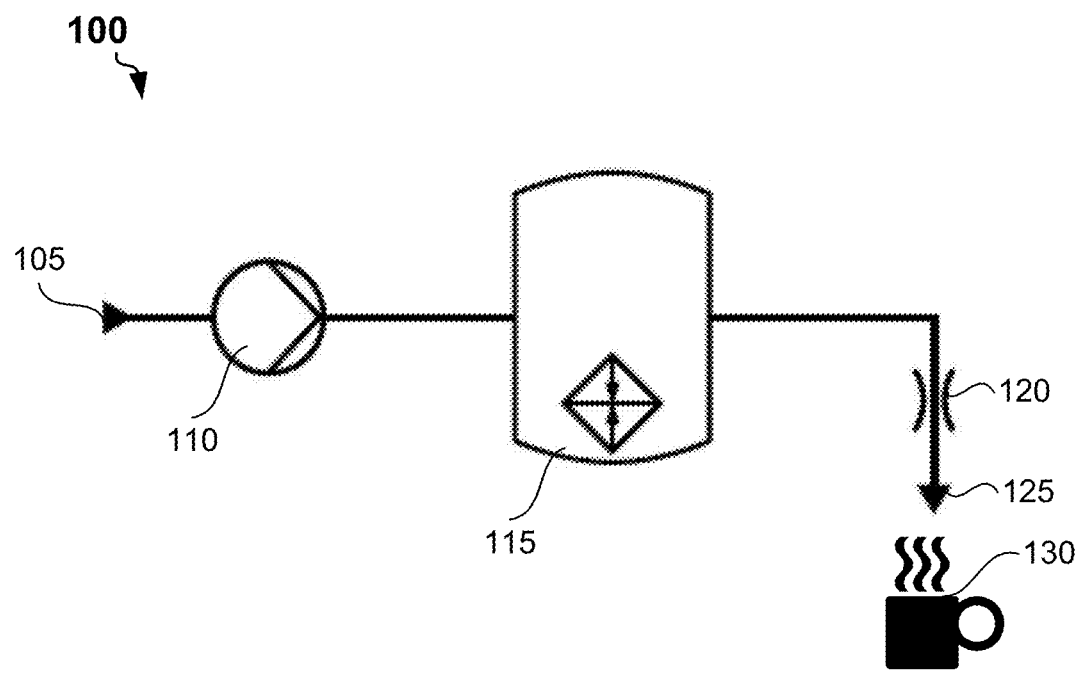
FIG. 1 is a mechanical schematic of a conventional espresso machine.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides a coffee machine and method for manufacturing the coffee machine. The coffee machine may include a flow-controlled and temperature-controlled coffee machine. The coffee machine can provide superior temperature and flow control to an operator (e.g., a barista) in a smaller footprint than traditional coffee machines. The coffee machine includes at least one syringe pump (or a plurality of redundant syringe pumps in some embodiments) to control the pressure of water flow and an in-line heater (also referred herein to an in-line heating element) to rapidly change the temperature of the water. The in-line heater may include one or more heating elements covered with a special type of a vessel chamber that has anti-corrosion properties. The in-line heater provides indirect heating of fluid. Specifically, the fluid is circulated through a closed loop around the heating elements until the fluid reaches the correct temperature.

The in-line heater can be located down the stream from the syringe pump and, therefore, is not required to maintain pressure as boilers of traditional coffee machines. Accordingly, the in-line heater can be inexpensively made of materials that do not react with water and do not produce sediments. The in-line heater allows physical separation of the syringe pump from the point of delivery without taking prohibitive measures to insulate a water line. A sufficiently powerful in-line heater is able to heat brewing water from inlet temperature to the desired brewing temperature and obviates the need for a heated reservoir. This allows baristas to append a full range of variables in a single device: a flow profile, temperature profile, ground geometry and input mass, and a filter type and geometry such that the coffee machine can achieve a total continuum between espresso, drip coffee, and cold-brew coffee, as well as other types of coffee beverages.

The coffee machine allows controlling the flow rate directly by using a syringe pump to change pressure as needed depending on predetermined criteria. The flow rate can be controlled to allow the in-line heater to maintain a certain temperature and, thus, the desired temperature can be maintained by using a small heating element instead of a large boiler. This direct control of the flow rate allows maintaining a desired and constant temperature control using the in-line heating element and no boiler.

Thus, instead of resistance of coffee dictating the flow rate in traditional coffee machines, the syringe pump can be used to maintain the flow rate. Specifically, to maintain the flow rate, the syringe pump can have an electric motor configured to provide the required flow rate. For example, one turn of the electric motor may push through a predetermined volume of water, e.g., a predetermined number of milliliters of water per second. The in-line heater can dictate the temperature of the water as needed during the extraction process.

Another advantage of the coffee machine is fast and dynamic variation of the temperature during the extraction process that can be controlled according to setting provided by an operator. For example, the coffee machine can start the process with one temperature, and then increase or decrease the temperature as desired.

To avoid unnatural twisting motion required to perform by a barista while making espresso, the traditional E61 group head can be replaced with a forward-sliding group head such that the portafilter can be moved along a track just under the group head. A contact switch can be installed at the end of the track. When the barista releases the group head, the portafilter can be weighed, the weight of the portafilter (which is stored in a memory of the coffee machine) can be subtracted, yielding the weight of the grounds. The group head can then drive the portafilter up, thereby sealing a gasket and commencing the extraction according to a pre-programmed temperature and flow profile, using the weight of the grinds as an input.

A programming interface can be designed to optimize experience of the barista. In some embodiments, the programming interface can include a learning mode to be executed at the beginning of the day or when a new bean is used such that a particular extraction can be repeated automatically later. In some embodiments, a barista is able to make fine adjustments (increase or decrease extraction or increase or decrease strength) to the learned mode.

Additionally, the programming interface can provide a fine adjustment mode along two dimensions (increase or decrease extraction, increase or decrease strength) enabling an operator to easily make minor adjustments to the brewing profile.

The coffee machine allows achieving a truly constant temperature or changing the temperature during the course of extraction according to a predetermined brewing profile. Using the coffee machine, the extraction can be started, for example, at 93 degrees Celsius, raised to 98 degrees Celsius for 10 seconds, and then brought down to 85 degrees Celsius for the last 10 seconds. Lower temperatures may be needed for a "cold" brew.

Thus, the coffee machine is smaller, less expensive to build, and less expensive to maintain and gives the barista more control over the extraction process than a traditional machine.

In some embodiments, the coffee machine may have a pressure sensor configured to measure the pressure of water. An electronic control module can receive, via a feedback loop, the pressure measured by the pressure sensor. Based on the measured pressure, the electronic control module may adjust the pressure by using the syringe pump, e.g., when a predetermined pressure is needed for preparation of a specific type of coffee beverage (such as nine bars for espresso). Additionally, the temperature can be adjusted based on the data received from a temperature sensor.

An example coffee machine may consist of an inlet, a syringe pump, an in-line heating element, a group head, and water lines connecting the inlet to the syringe pump, the syringe pump to the in-line heating element, and the in-line heating element to the group head. The coffee machine provides an improved control over brewing parameters to baristas, where the improved output quality flow rate is a primary factor in brewing characteristics and water pressure is secondary to the flow rate in controlling brewing to provide accurately controlled, non-constant flow rate and pressure (optionally, if desired) by directly controlling the flow rate of brewing water for accurate in-line heating.

Referring now to the drawings, FIG. 1 shows a mechanical schematic of a conventional espresso machine 100. The espresso machine 100 has an inlet 105 (connected to a water source, such as a reservoir or a water line (not shown)), a pump 110 as a fixed-pressure source (such as a manual piston, a vibration pump, a rotary pump, or gear pump), a boiler 115, a coffee puck 120, and an outlet 125. The pump 110 is used to force water from the inlet 105 into the boiler 115, which heats the water. The outlet of the boiler 115 is connected (via a group head and a portafilter (not shown)) to a coffee puck 120. The coffee puck 120 is a compressed disc of grounds placed into the portafilter and inserted together with the portafilter into the group head of the espresso machine 100. The water is pumped through the coffee puck 120 to produce espresso shown as coffee 130 at the outlet 125 of the espresso machine 100.

Figure 2:
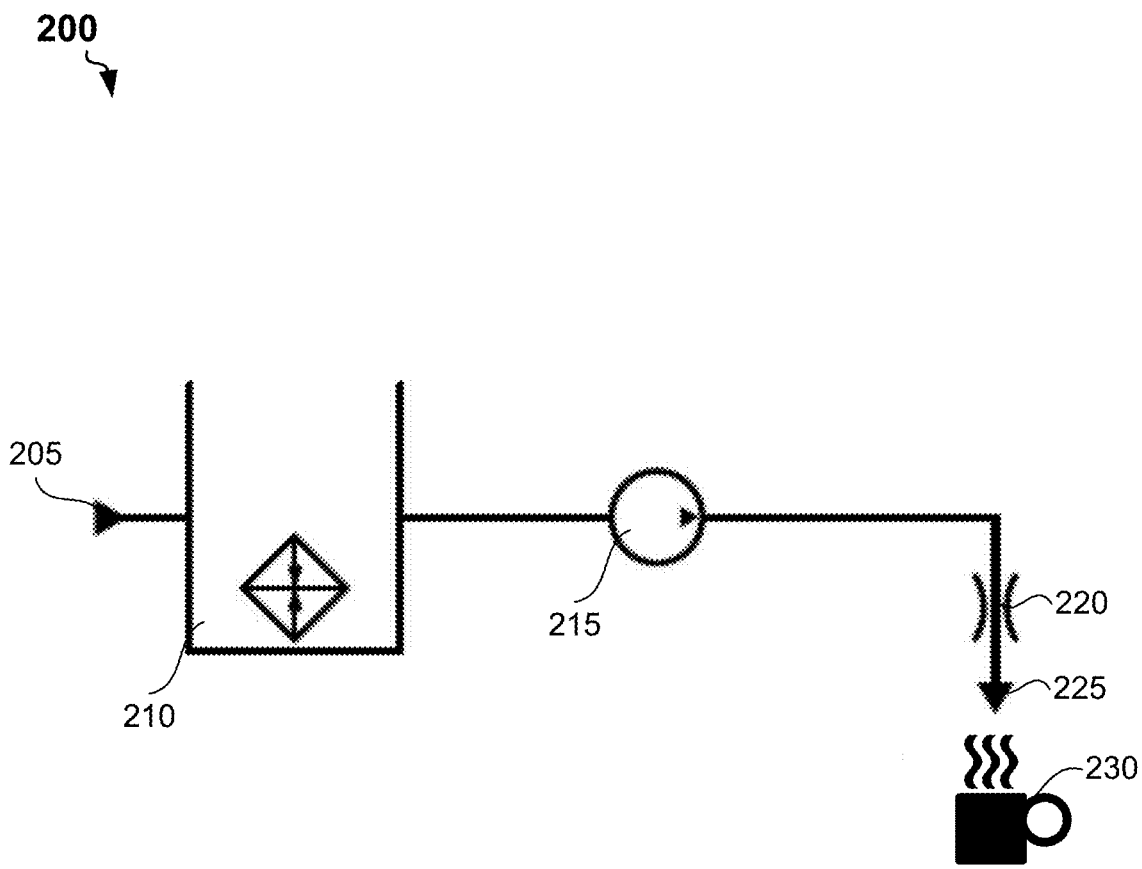
FIG. 2 is a mechanical schematic showing a high-level structure of a coffee machine, according to an example embodiment.

FIG. 2 shows a mechanical schematic of a high-level structure of a coffee machine 200 of the present disclosure, according to an example embodiment. The coffee machine 200 has a water inlet shown as an inlet 205, a water reservoir shown as a reservoir 210, a pump 215 placed downstream the reservoir 210, a mechanical resistor of water flow in the form of a compressed puck of ground coffee shown as a coffee puck 220, and an outlet 225. In an example embodiment, the reservoir 210 may be configured to heat the water. The pump 215 may include a fixed-displacement pump. The water passes from the inlet 205 into the reservoir 210 and then is pumped by the pump 215 from the reservoir 210 to the coffee puck 220. The water is pumped through the coffee puck 220 to produce espresso shown as coffee 230 at the outlet 225 of the coffee machine 200.

Figure 3:
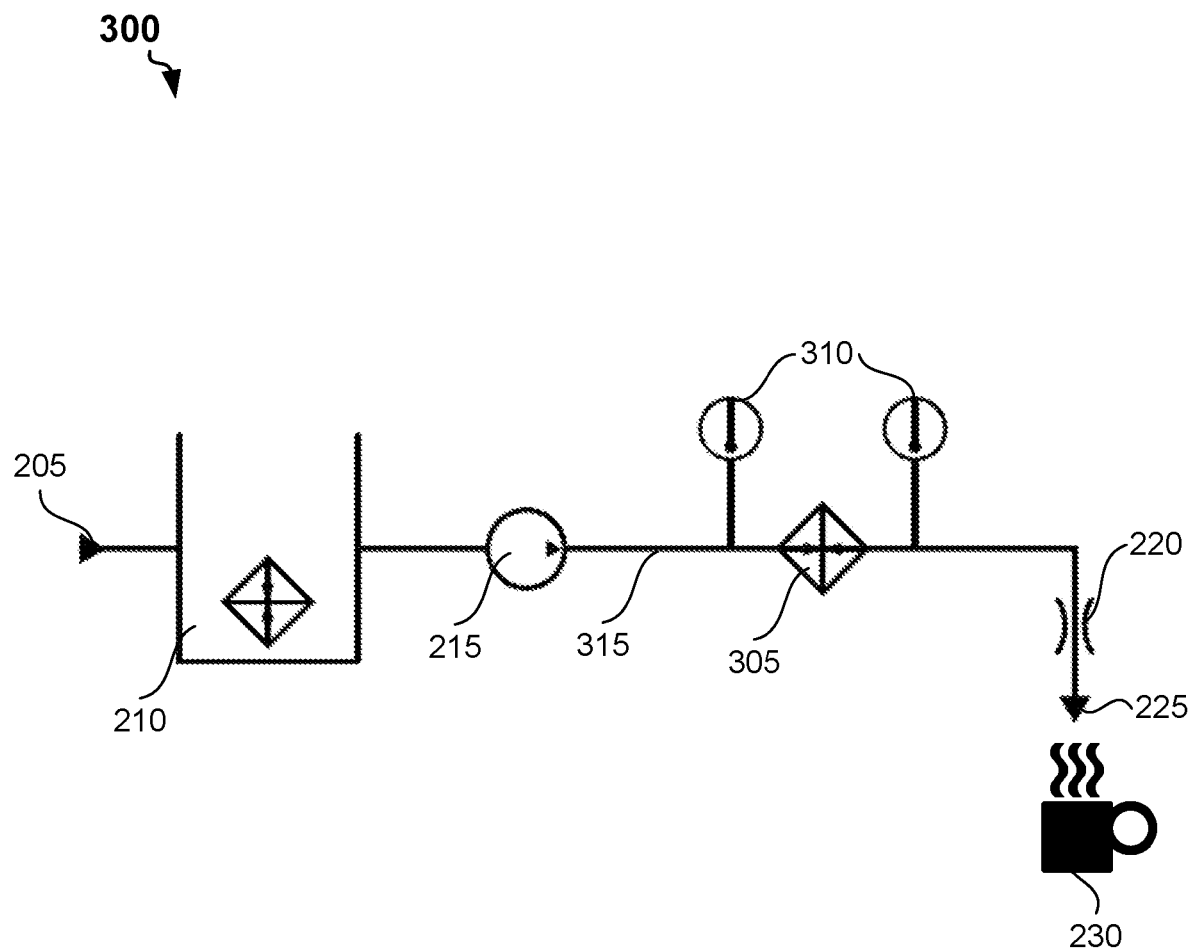
FIG. 3 shows a mechanical schematic showing a structure of a coffee machine, according to an example embodiment.

FIG. 3 shows a mechanical schematic showing a more detailed structure of a coffee machine 300 of the present disclosure, according to an example embodiment. The coffee machine 300 may have an in-line heating element 305 placed after the pump 215. One or more temperature sensors 310 may be connected to a water line 315 (e.g., upstream and downstream the in-line heating element 305) enabling to deliver water that is partially or wholly heated on demand. The one or more temperature sensors 310 may include one or more thermocouples.

In an example embodiment, the reservoir 210 can be configured to heat or pre-heat the water. The extent to which heating is done by the reservoir 210 and the in-line heating element 305 may be varied. In some example embodiment, providing more heating by the reservoir 210 may result in greater temperature stability, whereas providing more heating by the in-line heating element 305 may result in a wider range of achievable temperature profiles.

Figure 4:
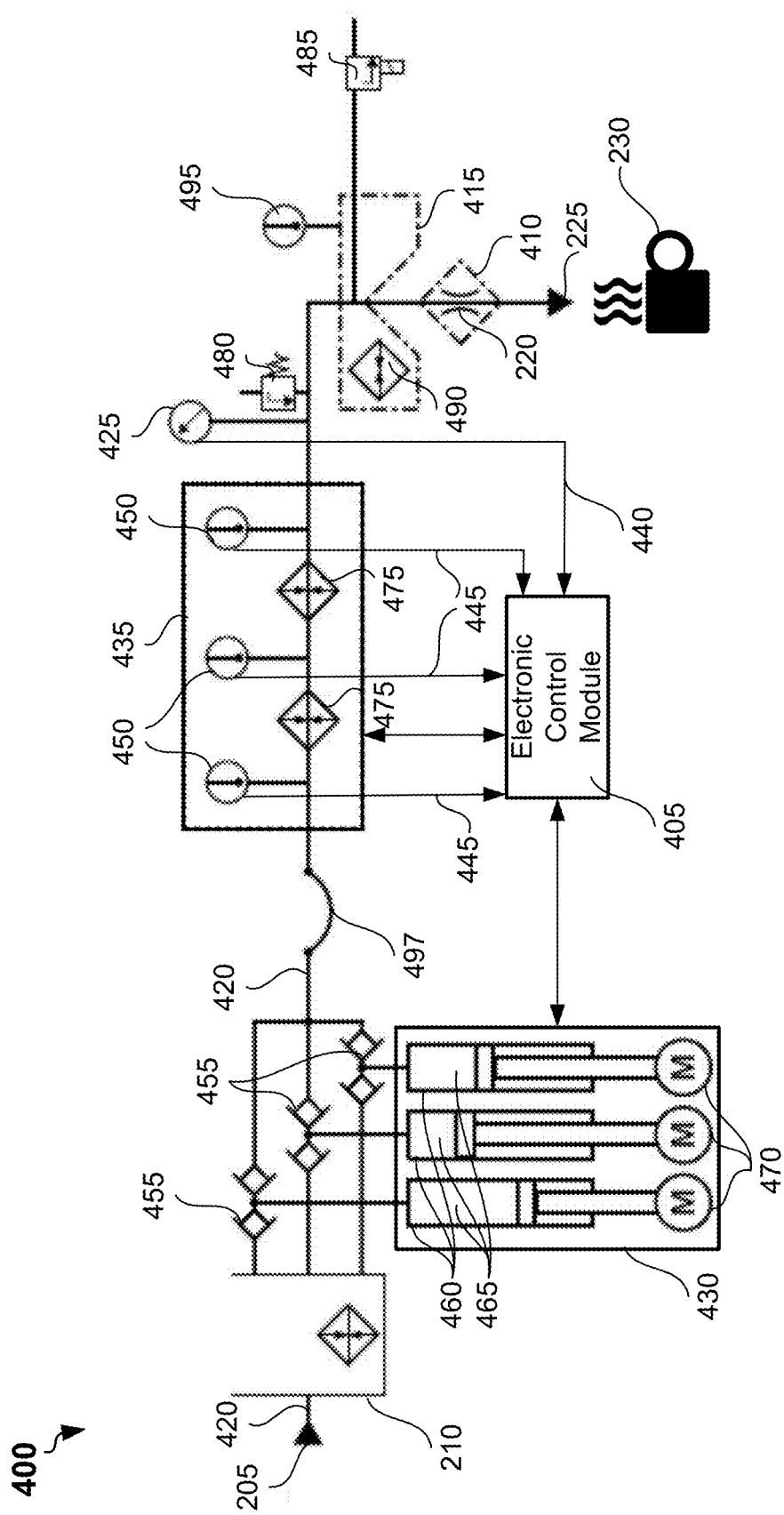
FIG. 4 is a schematic showing diagram showing a detailed structure of a coffee machine, according to an example embodiment.

FIG. 4 is a schematic showing diagram a coffee machine 400 of the present disclosure, according to an example embodiment. The coffee machine 400 may include an inlet 205, optionally a reservoir 210, an electronic control module 405, a portafilter 410 configured to hold coffee, a group head 415 configured to receive the portafilter 410, at least one water line 420 configured to supply water, a pressure sensor 425 (optional) configured to sense a pressure of the water, at least one pump such as at least one syringe pump 430, an in-line heating element 435, at least one feedback loop shown as a feedback loop 440 and a feedback loop 445, and an outlet 225. The coffee machine 400 may further include at least one temperature sensor 450. The coffee machine 400 may further include check valves 455. In some embodiments, the coffee machine 400 may include no reservoir 210 with the water being provided from the input 205 to the at least one water line 420 (e.g., in a form of a tube) and then to other components of the coffee machine 400.

The at least one water line 420 may connect the inlet 205 to the at least one syringe pump 430, the at least one syringe pump 430 to the in-line heating element 435, and the in-line heating element 435 to the group head 415.

The electronic control module 405 may be configured to receive brewing settings. The brewing settings may include at least one flow set point and at least one temperature set point. The brewing settings may be provided by an operator of the coffee machine 400. In other example embodiments, the brewing settings may be predetermined based on a brewing profile. The brewing profile may include pre-programmed set points for preparing one or more of the following beverages: espresso (with the hot water being forced through compressed grounds and a mechanical filter, the pressure further increasing the rate of extraction and reducing the brewing time to under a minute), drip coffee (ground coffee combined with hot water, brewed coffee is mechanically separated from the depleted grounds after a few minutes, with the temperature increasing the rate of extraction and possible damage to compounds found in coffee), cold brew (with ground coffee being combined with cold water, the mixture held at a low temperature for several hours, then brewed coffee mechanically separated from the depleted grounds), and other beverages.

The electronic control module 405 may provide setting, such as the at least one flow set point, to the at least one syringe pump 430. The least one syringe pump 430 may be an infusion device configured to gradually administer specific amounts of fluids. The at least one syringe pump 430 may receive the at least one flow set point from the electronic control module 405 and pressurize the water to attain the at least one flow set point. In an example embodiment, the at least one flow set point may be selected to maintain the at least one temperature set point.

The at least one syringe pump 430 may pressurize the water based on predetermined criteria. Specifically, the at least one syringe pump 430 may have an electric motor 470 configured to provide the pressure of water selected based on predetermined criteria. The predetermined criteria may include, for example, the pressure needed for preparing specific types of coffee beverages. In an example embodiment, the electric motor 470 may have parameters, according to which, one turn of the electric motor 470 provides a pressure that results in a predetermined flow rate (e.g., a predetermined number of milliliters of water per second).

The electronic control module 405 may provide setting to the in-line heating element 435. The in-line heating element 435 may be configured to heat water on-demand. The in-line heating element 435 may be located down the stream from the at least one syringe pump 430. In an example embodiment, the electronic control module may include a PID controller configured to control the at least one temperature set point within a range of 0.5° C. to 1.0° C.

Conventional fixed-pressure coffee machines fail to achieve stable temperature control because a hydraulic resistor (the coffee puck) can be unstable, causing the flow rate to vary unpredictably over the course of extraction. The coffee machine 400 described herein is a fixed-flow system. Since the flow is directly controlled, the amount of energy needed to achieve the desired temperature can be computed as follows:

$$I \propto (T_0 - T_i) \cdot \Phi,$$

where I is the in-line heater current, $T_0$ and $T_i$ are the current temperature and desired temperature, respectively, and $\Phi$ is the rate of water flow.

With the in-line heater, the pump can be physically separated from the point of delivery without taking prohibitive measures to insulate the water line. A sufficiently powerful in-line heater that is able to heat water from inlet temperature to the desired brewing temperature may obviate the need for a heated reservoir.

Improved temperature stability and redundancy can be achieved in multiple stages. Subsequent stages could be able to use the change in temperature from earlier stages to improve the estimation of the flow rate. For example:

$$I_1 \propto 0.8(T_0 - T_i) \cdot \Phi,$$

$$I_2 \propto \frac{T_0 - T_m}{T_0 - T_i} I_1,$$

where $I_1$ and $I_2$ are the in-line heater currents of the first- and second-stage in-line heaters, respectively, $T_i$ is the temperature before the first stage, $T_m$, is the temperature in between the stages, and $T_o$ is the desired output temperature.

Finally, this configuration enables the coffee machine 400 to provide temperature profiling, namely the direct dynamic temperature control to provide extraction control beyond any traditional coffee machine.

The in-line heating element 435 may receive the at least one temperature set point from the electronic control module 405 and may control temperature of the water according to the at least one temperature set point during an extraction process. Specifically, the in-line heating element 435 may be configured to change the at least one temperature set point based on the brewing settings.

During the operation of the coffee machine 400, the feedback loop 445 may provide the temperature measured by the temperature sensor 450 to the electronic control module 405. Upon receiving the values of temperature via the feedback loop 445, the electronic control module 405 may selectively adjust the temperature based on the brewing settings. Thus, the at least one flow rate set point and the at least one temperature set point can vary during the extraction process according to the brewing settings.

Optionally, during the operation of the coffee machine 400, the feedback loop 440 may be configured to provide the pressure measured by the pressure sensor 425 to the electronic control module 405. Upon receiving the pressure values via the feedback loop 440, the electronic control module 405 may selectively adjust the pressure based on the brewing settings.

The feedback loop 440 and the feedback loop 445 may include an open loop, a linear closed-loop, and a non-linear closed-loop.

The at least one syringe pump 430 may push out the fluid via a piston 465 (acting as a syringe) to obtain a predetermined volume depending on the size of the piston 465. In an example embodiment, the at least one syringe pump 430 may include a plurality of redundant syringe pumps 460 forming a reciprocating syringe pump assembly to achieve a continuous flow. Check valves 455 can be placed at the inputs and outputs of each of the syringe pumps 460. Each syringe pump 460 may have a piston 465 and an electric motor 470 arranged to cause linear motion of the piston 465. Additionally, a linear encoder for the at least one syringe pump 430 can provide an additional level of precision for the syringe pump 430.

In an example embodiment, the electronic control module 405 may include a learning mode configured to learn a brewing profile executed manually by an operator. Specifically, the operator may set the temperature and pressure manually. The coffee machine 400 may further include a memory unit (not shown) that stores the brewing profile learned by the electronic control module 405 based on temperature and pressure values received from the operator.

In further example embodiments, the electronic control module 405 may be connected to a data network and receive a brewing profile from external sources. The external sources may include database records stored on the data network, other coffee machines connected to the data network, and other network resources. A plurality of coffee machines may store learned profiles in a shared memory in the database. For example, the electronic control module 405 of the coffee machine 400 may receive brewing profiles learned by other coffee machines and stored in the database.

Thus, in the coffee machine 400, the flow can be directly controlled by the actuation of the syringe pump. Furthermore, the buildup of scale in the heater can be mitigated by the use of plastic components and the absence of stagnant, pressurized, heated water. The water can be safely conditioned to avoid rust since the active ions have no iron-bearing components to attack. Thus, in contrast to the conventional coffee machines, the water reservoir is not required to maintain pressure, such that the coffee machine 400 can be compact and inexpensive to manufacture and maintain.

The group head is traditionally heated by drawing energy from a boiler by conduction (often the group head and boiler are a single component), by circulating boiler water through the group head (a "saturated group"), or by separately heating the group head via resistive heating. In the coffee machine 400, the group head may be also cooled to provide aggressive two-sided control. Cooling can be achieved via a fan or circulating lower-temperature fluid over or through the group head. The group head can also incorporate or be encased in a material that undergoes a phase change at the desired temperature, which could provide additional thermal inertia by stabilizing the temperature of the group head at the temperature of the phase change of the material.

By directly heating the group head and removing the need for a vessel that contains a large quantity of water at high temperature and pressure (i.e., the boiler), a greater degree of modularity can be provided by the coffee machine 400 without sacrificing the cost or efficiency.

In an example embodiment, a current can be measured at the pump and pressure can be measured before the group head for safety reasons. A signal indicating how much force the pump is applying to achieve the flow rate may be provided to the electronic control module 405. The coffee machine 400 can have light emitting diodes to indicate unsafe conditions at any component. The electronic control module can incorporate information from sensors via an artificial intelligence network to detect conditions requiring service and to automatically take advantage of redundant components to increase the margin of safety, quickly detect gasket or motor failures and dynamically self-reconfigure, and report dangerous conditions to the operator.

In example embodiment, the coffee machine 400 may have one or more additional sensors configured to measure one or more of the following: ambient air temperature, inlet water temperature, reservoir outlet water temperature, pump current, and so forth. The sensors may further include a pump encoder (i.e., a linear encoder for a syringe pump, a rotary encoder for a rotary pump), a group head contact switch, a group head scale, a group head temperature sensor, an auto-lock current/force sensor, an under-group head scale, pre-group head temperature sensor(s), a pre-group head pressure gauge, and so forth.

In example embodiment, the coffee machine 400 may have one or more actuators, such as a reservoir input solenoid/valve, a reservoir temperature actuator, a reservoir selection solenoid, a group head temperature actuator, a group head auto-lock, a basket valve, a basket stir-bar, a dry group head solenoid, and so forth.

Figure 5:
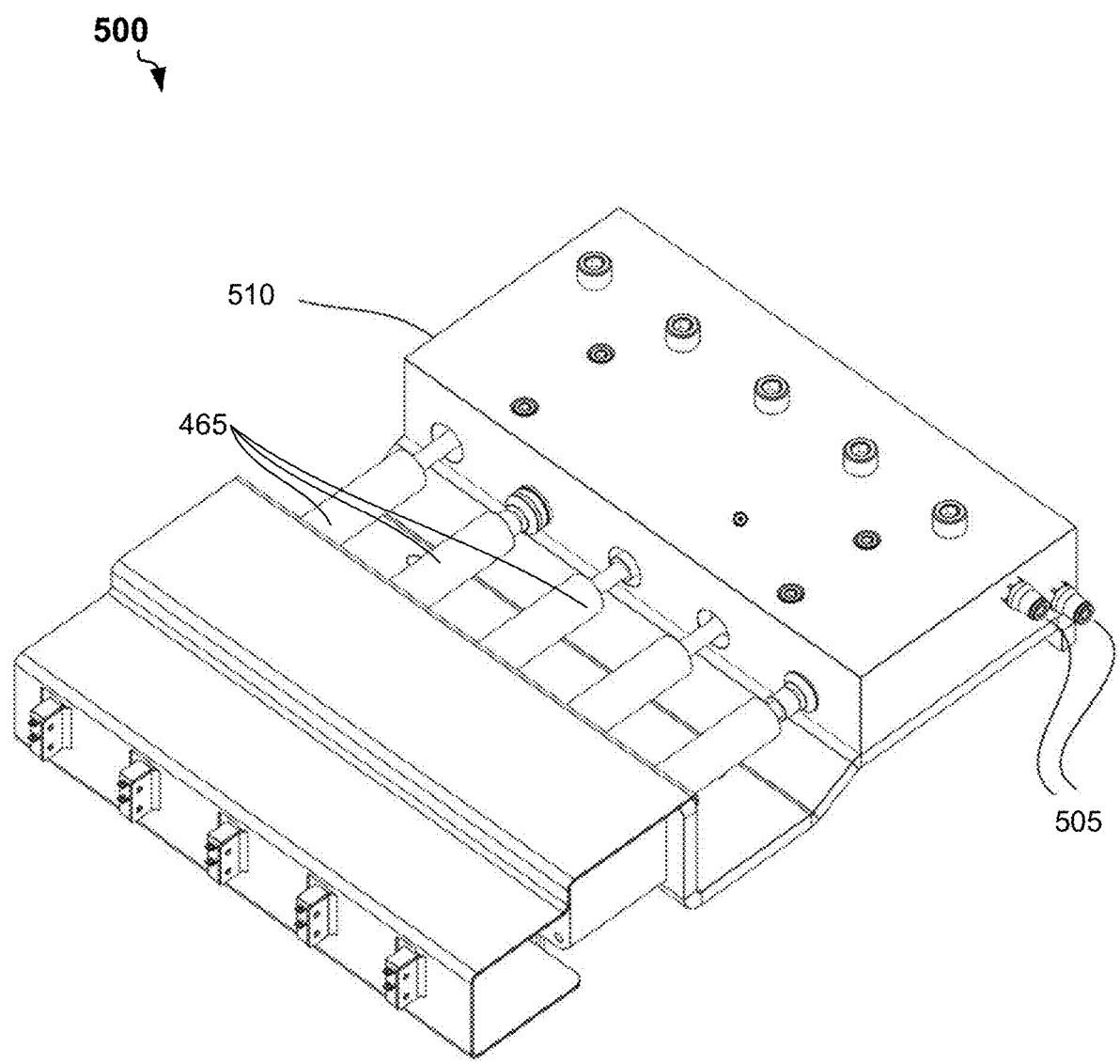
FIG. 5 shows a mechanical diagram of a syringe pump assembly, according to an example embodiment.

FIG. 5 shows a mechanical diagram of a syringe pump assembly 500. The pump assembly 500 may have hydraulic interfaces 505 and a manifold assembly 510 for pistons 465.

Referring again to FIG. 4, in an example embodiment, the in-line heating element 435 may be provided in the form of a multistage in-line heating element and may include more than one in-line heater 475 and more than one temperature sensor 450. The temperature sensors 450 may be present before and after each in-line heater 475. The in-line heating element 435 may precisely control the temperature of the group head 415. In an example embodiment, the in-line heating element 435 may be made of materials selected to be non-reactive with the water to avoid sediment formation.

An over-pressure valve 480 can be placed to guarantee that the pressure does not exceed the mechanical specifications of the components of the coffee machine 400. The coffee machine 400 may further include an electrically actuated drain 485 to partially dry the coffee puck 220 after the extraction and prior to the pressure release. In an example embodiment, the drain 485 may include a manual valve to relieve pressure and draw water at the end of an extraction.

Additionally, a group head heater 490 and a temperature sensor 490 may be provided in the group head 415. The group head heater 490 may heat the group head 415 in order to precisely control the temperature of the group head 415 based on the measurements of the temperature sensor 490 placed into the group head 415.

Figure 6B:
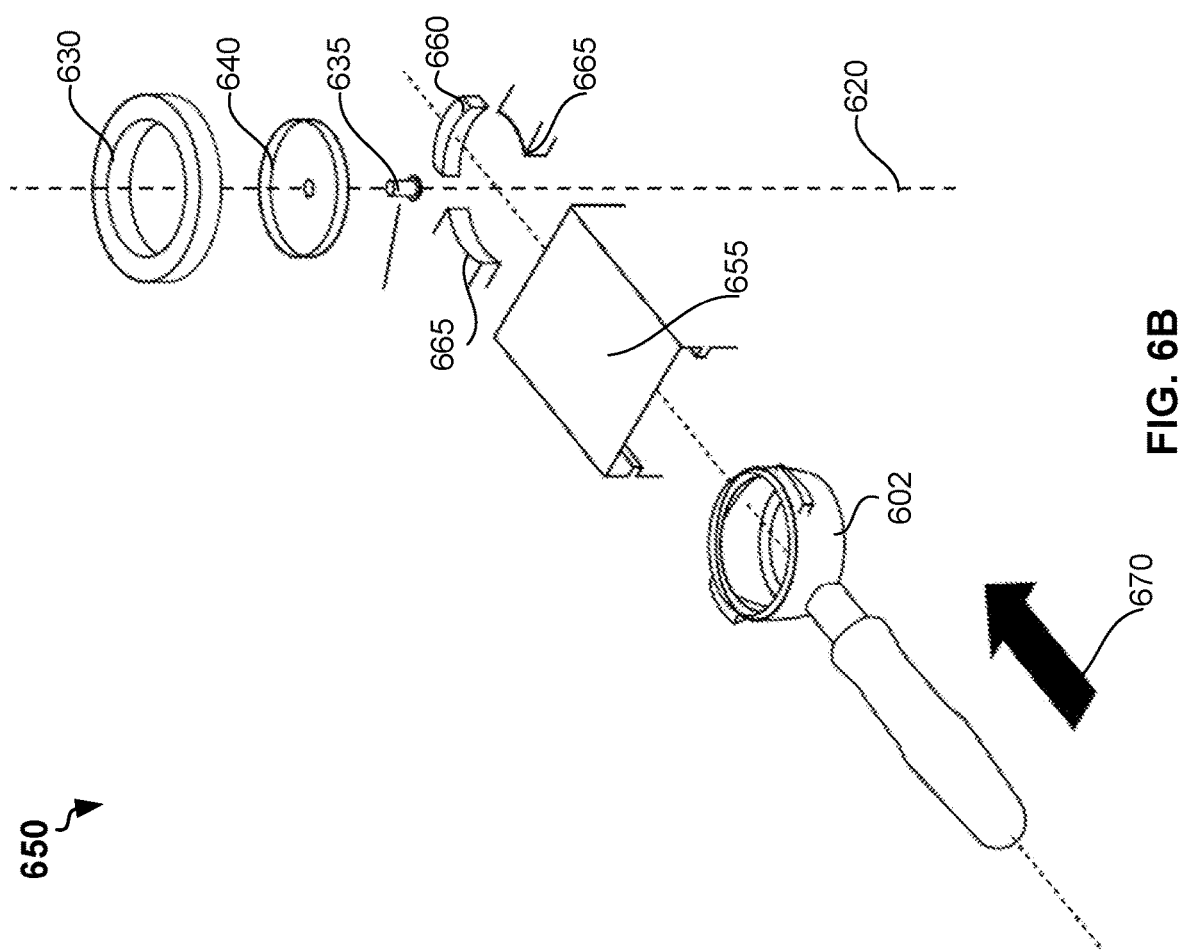
FIG. 6B is an exploded view of a slide-in portafilter used in a coffee machine, according to an example embodiment.
Figure 6A:
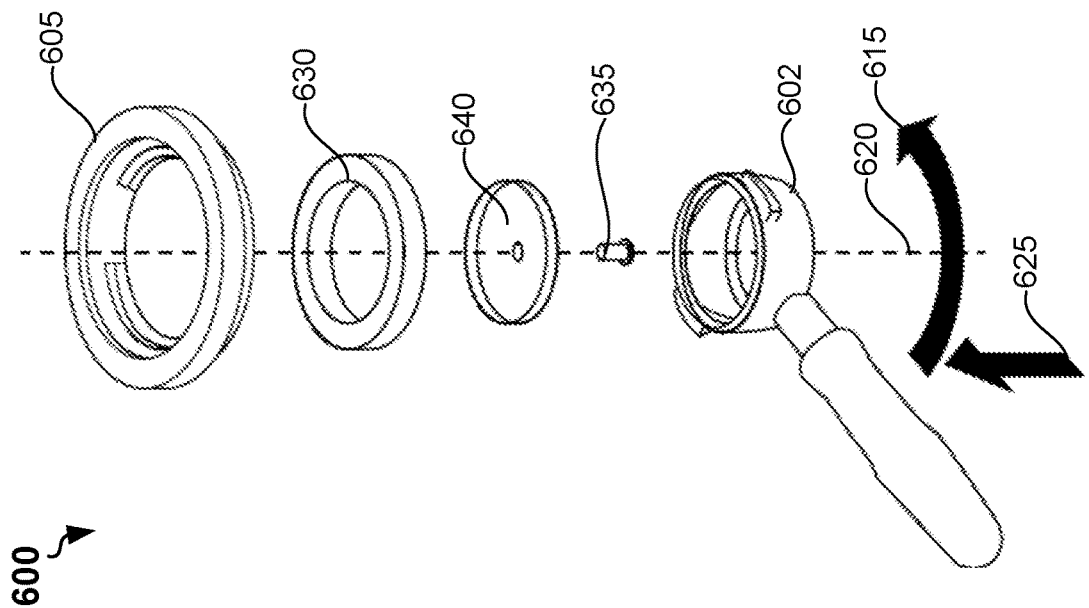
FIG. 6A is an exploded view of a portafilter used in a coffee machine, according to an example embodiment.

FIG. 6A is an exploded view of a portafilter 600 used in the coffee machine, according to another embodiment. The portafilter 600 may include a body 602 and a bayonet ring 605, which may create a mechanism to convert a rotation 615 of the body 602 of the portafilter 600 about an axis 620 into a linear movement 625 into a gasket 630, thereby creating the pressure seal needed for brewing. The water can be delivered through a dispersion screw 635 and spread over the surface of the body 602 of the portafilter 600 via a screen 640.

FIG. 6B is an exploded view of a slide-in portafilter 650 used in the coffee machine, according to another embodiment. The body 602 of the portafilter 650 can be moved in a direction 670 along a track 655 under a group head, which is composed of the gasket 630, the screen 640, and the dispersion screw 635. In this embodiment, the group head is a forward-sliding group head configured to receive the body 602 of the portafilter 650 being moved along the track 655. A contact switch 660 and a lift coupler 665 may be provided at the end of the track 655 to interface the body 602 of the portafilter 650 to the group head and auto-lock the body 602 with the group head. The contact switch 660 may be embedded into the group head to detect when the body 602 of the portafilter 650 is present to trigger auto-lock and/or to begin extraction. Additionally, a scale may be incorporated within the group head to measure the weight of the ground coffee. When an operator releases the group head, the portafilter 650 is weighed, the weight of the portafilter 650 (which is stored in a memory unit of the coffee machine) is subtracted, and the weight of the ground coffee is calculated. The portafilter 650 is then driven up, thereby sealing the gasket 630 and commencing the extraction according to preprogrammed temperature and flow set points profile using the weight of the ground coffee as an input. Therefore, the group head automatically maneuvers the portafilter 650 to seal the gasket 630 before extraction begins and to release the gasket 630 after the extraction completes.

Figure 7:
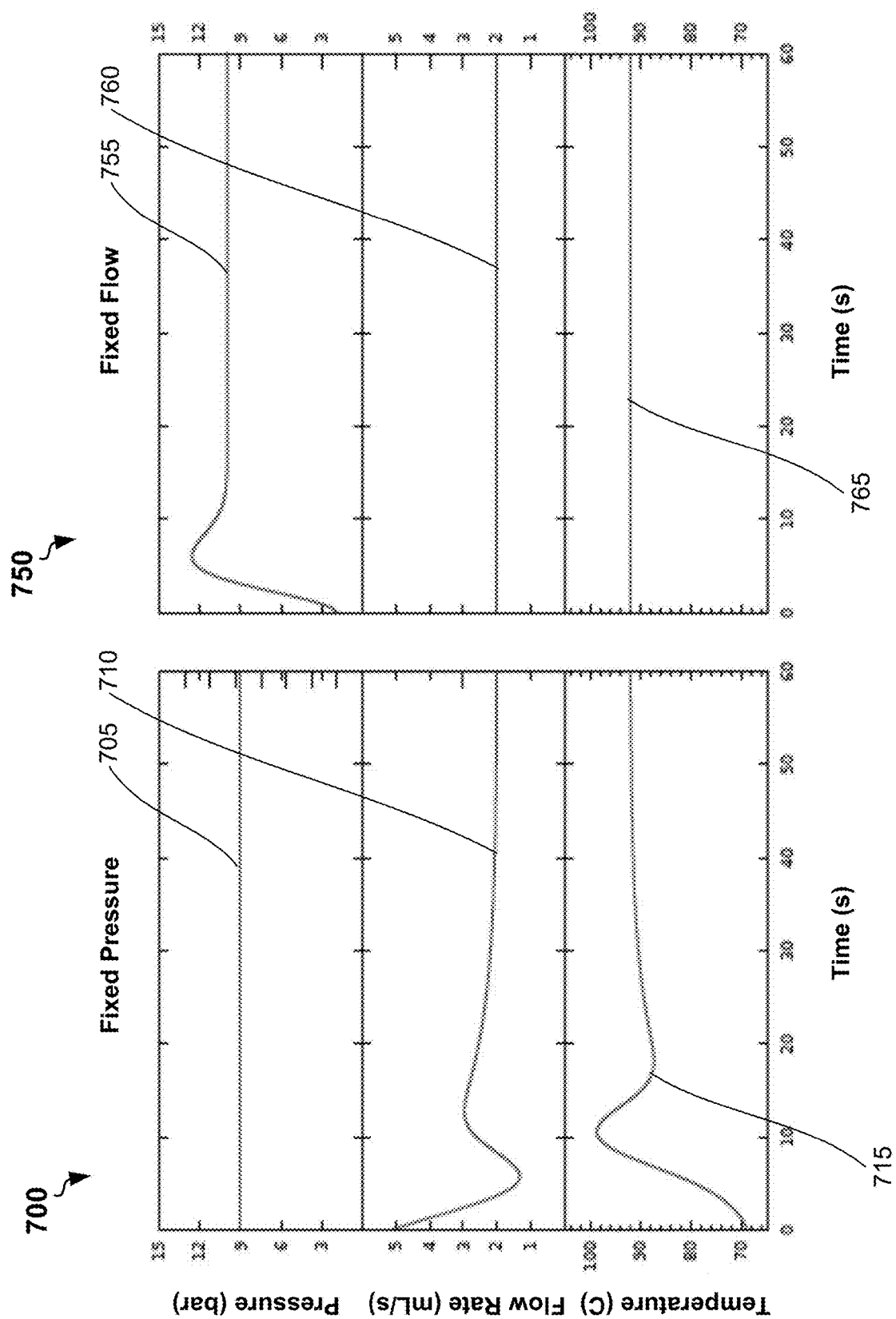
FIG. 7 shows a diagram illustrating flow characteristics, according to an example embodiment.

FIG. 7 shows a diagram 700 illustrating flow characteristics of a conventional coffee machine. In the conventional coffee machine, the pressure 705 is a primary variable used to control the flow rate 710. In view of this, a fixed-pressure pump is usually provided in the conventional coffee machine. The temperature 715 is usually maintained at a predetermined range by a boiler.

FIG. 7 also shows a diagram 750 illustrating flow characteristics of a coffee machine of the present disclosure. The flow rate 760 is primary variable, while the pressure 755 is a secondary variable. Thus, a fixed-flow pump is provided to control the flow rate 760. Additionally, as the flow rate 760 is controlled, the amount of water that is passing through the in-line heating element is known. Accordingly, a precise control of the temperature 765 can be provided by the in-line heating element based on the calculated amount of water.

Figure 8B:
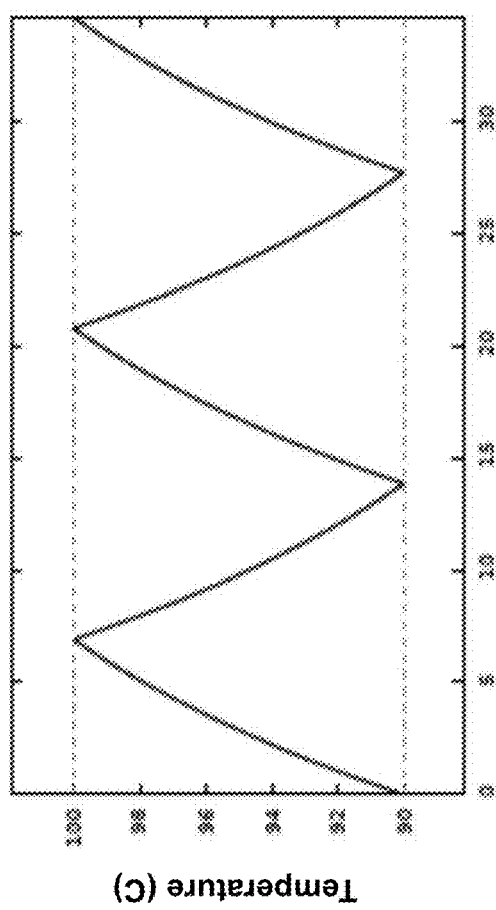
FIGS. 8A and 8B illustrate controlling temperature via a feedback loop in conventional coffee machines.
Figure 8D:
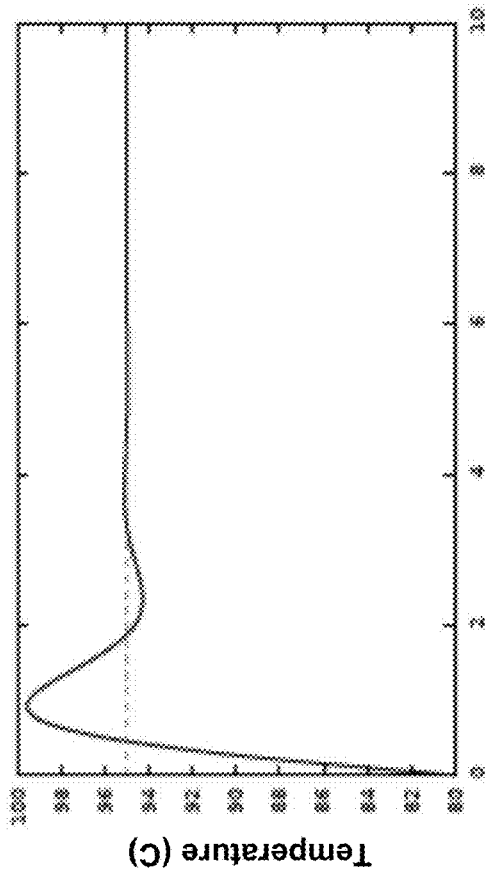
FIGS. 8C and 8D illustrate controlling temperature via a feedback loop in a coffee machine, according to an example embodiment.
Figure 8A:
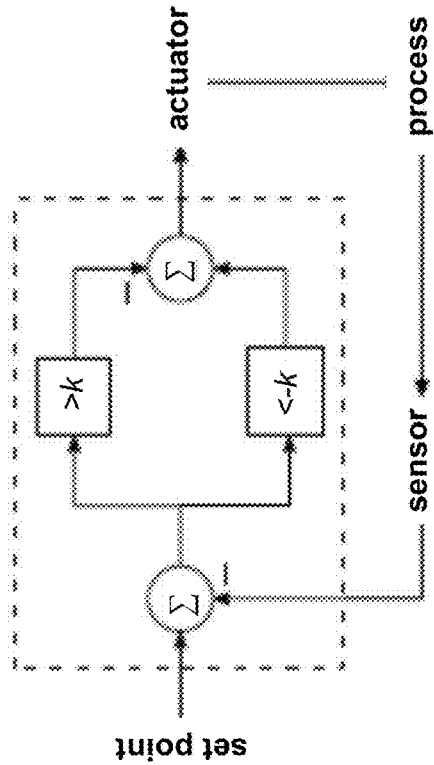

FIGS. 8A and 8B illustrate controlling temperature via a feedback loop in conventional coffee machines. Traditionally, the temperature of a boiler is controlled via a "bang-bang" controller: a heating coil of the boiler is switched on when the sensed temperature falls below a certain threshold $T_1$ and is switched off when the sensed temperature rises above another threshold $T_2$. The choice of the difference between the two thresholds $T_2-T_1$ is a tradeoff between improved temperature stability and improved energy consumption and heating coil life. Typical values are in the 5-10° C. range. See FIG. 8B showing a temperature profile provided by conventional coffee machines.

Figure 8C:
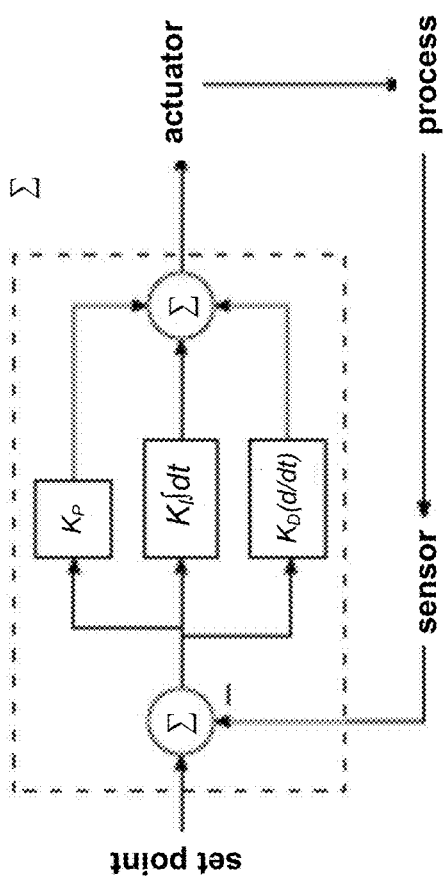

FIGS. 8C and 8D illustrate controlling temperature via a feedback loop in the coffee machine of the present disclosure. In espresso preparation, the flavor is sensitive to the temperature of brewing water. Thus, the PID controller and a feedback loop can be used to efficiently control the temperature of the water in the in-line heating element to a narrower range of about 1° C. FIG. 8D shows a temperature profile provided by the coffee machine.

The coffee machine can be configured to make use of a multi-input electronic control module, which is aware not only of the temperature within the reservoir, but also of the schedule of water added to and removed from the reservoir, the temperature of inlet water, the temperature of the surrounding environment and the resulting temperature of water at the portafilter (the object of control). This enables the coffee machine to achieve further levels of temperature stability and efficiency.

FIG. 9 is a flow chart of an example method 900 for manufacturing a coffee machine, according to some example embodiments. The method 900 may commence with providing an electronic control module at operation 905. The electronic control module can be configured to receive brewing settings. The brewing settings can include at least one flow set point and at least one temperature set point. The method 900 may further include providing, at operation 910, a portafilter configured to hold coffee. The method 900 may then continue with providing, at operation 915, a group head configured to receive the portafilter. In an example embodiment, the group head may be provided in a form of a forward-sliding group head configured to receive the portafilter being moved along a track.

The method 900 may further include providing, at operation 920, at least one water line configured to supply water.

The method 900 may further include providing at least one syringe pump at operation 925. The at least one syringe pump may be configured to pressurize the water based on predetermined criteria to attain the at least one flow set point. The one syringe pump may be provided in a form of a plurality of redundant syringe pumps.

The method 900 may continue with providing an in-line heating element at operation 930. The in-line heating element may be configured to control a temperature of the water according to the at least one temperature set point during an extraction process. The in-line heating element may be located down the stream from the at least one syringe pump.

The method 900 may further include providing a feedback loop at operation 935. The feedback loop may be configured to provide the temperature to the electronic control module. The electronic control module may be further configured to selectively adjust the temperature based on the brewing settings.

The method 900 may further include connecting, via the at least one water line, an inlet to the syringe pump, connecting the syringe pump to the in-line heating element, and connecting the in-line heating element to the group head.

The method 900 may optionally include providing a pressure sensor. The pressure sensor may be configured to sense pressure of the water. The feedback loop may be further configured to provide the pressure measured by the pressure sensor to the electronic control module. The electronic control module may be further configured to selectively adjust the pressure based on the brewing settings.

Figure 10:
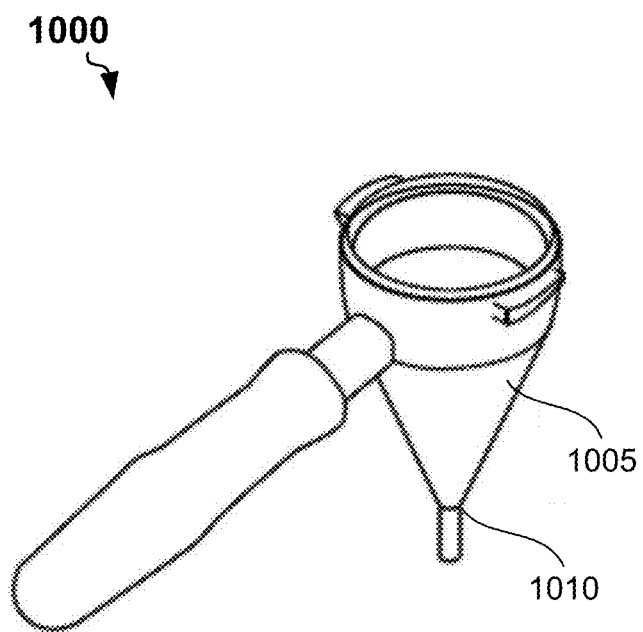
FIG. 10 is a schematic diagram showing a group head used in a coffee machine, according to an example embodiment.

FIG. 10 is a schematic diagram showing a group head 1000 used in the coffee machine, according to an example embodiment. The group head 1000 may include a basket 1005 and a valve 1010. The group head 1010 can be used for larger quantities of grounds, for example, to accommodate drip baskets that operate at atmospheric pressure. The valve 1010 may be provided at the bottom of the basket 1005, such that dwell time could be separately controlled. The group head 1000 may also accommodate a larger basket, enabling the coffee machine to be used as a batch-brewer.

Thus, baristas may explore a full range of variables in a single device: flow profile, temperature profile, ground geometry and input mass, and filter type and geometry: the device can achieve a continuum between espresso, drip, and cold-brew.

Additionally, conventional group heads are not height adjustable. In the coffee machine 400, the group head can be put on an adjustable arm (e.g., on a vertical rack-and-pinion) to become height adjustable quickly and safely without compromising quality or temperature stability. Therefore, the group head is height-adjustable to adjust for a wide range of heights.

Figure 11:
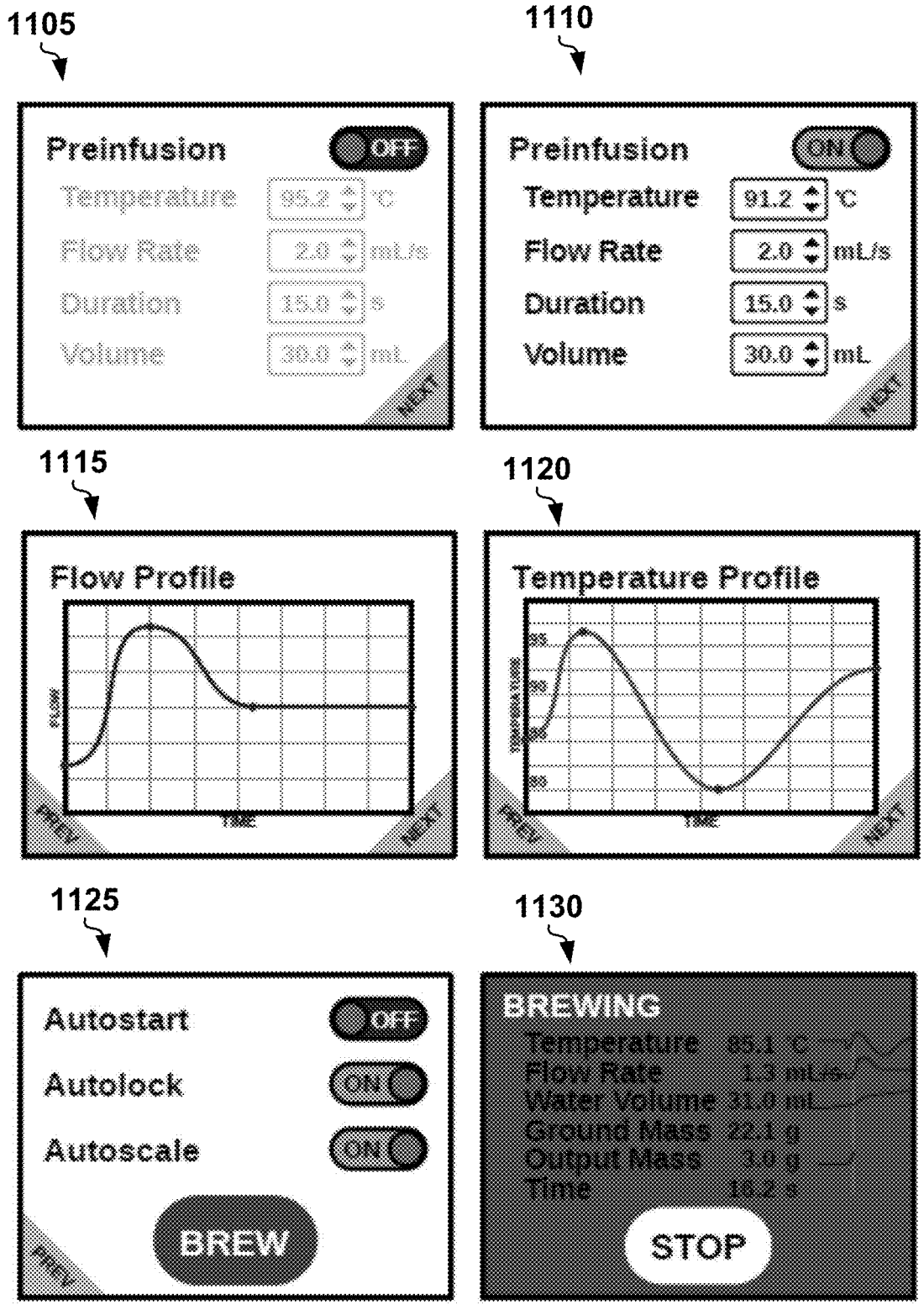
FIG. 11 shows a user interface associated with a coffee machine, according to an example embodiment.

FIG. 11 shows a user interface associated with a coffee machine. In some embodiments, the coffee machine may have an embedded touchscreen on which the user interface is displayed. In other embodiments, the user interface may be shown via a mobile application associated with the coffee machine and running on a mobile device associated with an operator.

The operator may use the user interface 1105 and 1110 to select parameters of a preinfusion process. The operator may also view the flow profile and the temperature profile on the user interface 1115 and user interface 1120, respectively. The operator may use the user interface 1125 to select autostart, autolock, and autoscale options. The operator may also use the user interface 1130 to select, change, and/or visualize a brewing profile.

The user interface may include an analog interface (e.g., potentiometers), adjustment buttons (e.g., increase/decrease temperature), an embedded screen, an embedded digitizer (e.g., a touchscreen), low-level interfaces, both wired (e.g., a Universal Serial Bus (USB)) and wireless (e.g., Bluetooth), and so forth.

In an example embodiment of operation of the coffee machine, an operator of the coffee machine may be executing, for example, these nine steps: removing a portafilter from a group head, drying a basket of the portafilter, placing the portafilter in a grinder, activating the grinder, leveling grounds and tamping, placing the portafilter into the group head, activating the coffee machine, removing the portafilter when the extraction completes, and knocking the depleted coffee puck into a knockbox.

Figure 12:
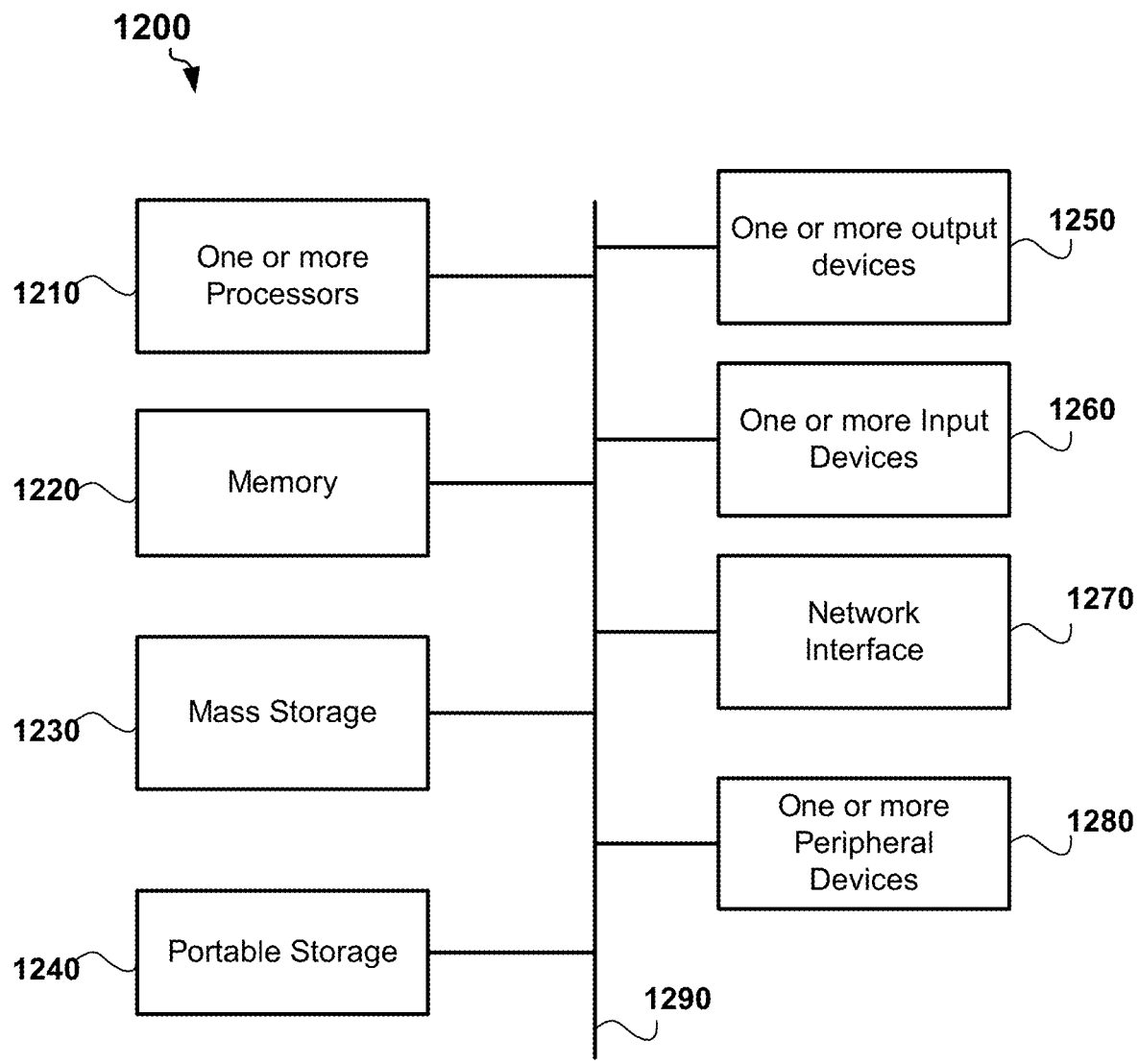
FIG. 12 shows a computing system that can be used in association with a coffee machine, according to an example embodiment.

FIG. 12 illustrates an exemplary computing system 1200 that may be used to implement embodiments described herein. The computing system 1200 can be implemented in the contexts of an electronic control module, a mobile application running on a mobile device associated with the coffee machine, or a user interface of the coffee machine. The exemplary computing system 1200 of FIG. 12 may include one or more processors 1210 and memory 1220. Memory 1220 may store, in part, instructions and data for execution by the one or more processors 1210. Memory 1220 can store the executable code when the exemplary computing system 1200 is in operation. The exemplary computing system 1200 of FIG. 12 may further include a mass storage 1230, portable storage 1240, one or more output devices 1250, one or more input devices 1260, a network interface 1270, and one or more peripheral devices 1280.

The components shown in FIG. 12 are depicted as being connected via a single bus 1290. The components may be connected through one or more data transport means. The one or more processors 1210 and memory 1220 may be connected via a local microprocessor bus, and the mass storage 1230, one or more peripheral devices 1280, portable storage 1240, and network interface 1270 may be connected via one or more input/output buses.

Mass storage 1230, which may be implemented with a magnetic disk drive or an optical disk drive, is a non-volatile storage device for storing data and instructions for use by a magnetic disk or an optical disk drive, which in turn may be used by one or more processors 1210. Mass storage 1230 can store the system software for implementing embodiments described herein for purposes of loading that software into memory 1220.

Portable storage 1240 may operate in conjunction with a portable non-volatile storage medium, such as a compact disk (CD) or digital video disc (DVD), to input and output data and code to and from the computing system 1200 of FIG. 12. The system software for implementing embodiments described herein may be stored on such a portable medium and input to the computing system 1200 via the portable storage 1240.

One or more input devices 1260 provide a portion of a user interface. The one or more input devices 1260 may include an alphanumeric keypad, such as a keyboard, for inputting alphanumeric and other information, or a pointing device, such as a mouse, a trackball, a stylus, or cursor direction keys. Additionally, the computing system 1200 as shown in FIG. 12 includes one or more output devices 1250. Suitable one or more output devices 1250 include speakers, printers, network interfaces, and monitors.

Network interface 1270 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 1270 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 1280 may include any type of computer support device to add additional functionality to the computing system. The one or more peripheral devices 1280 may include a modem or a router.

The components contained in the exemplary computing system 1200 of FIG. 12 are those typically found in computing systems that may be suitable for use with embodiments described herein and are intended to represent a broad category of such computer components that are well known in the art. Thus, the exemplary computing system 1200 of FIG. 12 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, coffee machines and methods for manufacturing a coffee machine are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A coffee machine comprising:
an electronic control module configured to receive brewing settings, the brewing settings including at least one flow set point and at least one temperature set point;
a portafilter configured to hold coffee;
a group head configured to receive the portafilter;
at least one water line configured to supply water;
at least one syringe pump configured to administer predetermined amounts of the water based on predetermined criteria to attain a flow rate according to the at least one flow set point, the flow rate provided by the syringe pump being substantially unaffected by a flow resistance created by the coffee;
an in-line heating element configured to control a temperature of the water to attain the at least one temperature set point during an extraction process; and
a feedback loop configured to provide the temperature to the electronic control module, the electronic control module being further configured to selectively adjust the temperature based on the brewing settings.

2. The coffee machine of claim 1, wherein the in-line heating element is located down the stream from the at least one syringe pump.

3. The coffee machine of claim 1, wherein the at least one flow set point and the at least one temperature set point vary during the extraction process according to the brewing settings.

4. The coffee machine of claim 1, wherein the group head is a forward-sliding group head configured to receive the portafilter being moved along a track.

5. The coffee machine of claim 1, wherein the electronic control module includes a Proportional Integral Derivative (PID) controller configured to control the at least one temperature set point within a range of 0.5° C. to 1.0° C.

6. The coffee machine of claim 1, wherein the least one syringe pump includes a plurality of redundant syringe pumps.

7. The coffee machine of claim 1, wherein the in-line heating element is configured to change the at least one temperature set point based on the brewing settings.

8. The coffee machine of claim 1, wherein the in-line heating element is made of materials selected to be non-reactive with the water to avoid sediment formation.

9. The coffee machine of claim 1, wherein the at least one flow set point is selected to maintain the at least one temperature set point.

10. The coffee machine of claim 1, further comprising a pressure sensor configured to sense a pressure of the water, wherein the feedback loop is further configured to provide the pressure to the electronic control module, the electronic control module being further configured to selectively adjust the pressure based on the brewing settings.

11. The coffee machine of claim 1, wherein the electronic control module includes a learning mode configured to learn a brewing profile, the brewing profile being selected from the following: brewing profiles executed manually by an operator, brewing profiles received from external sources, brewing profiles received via a data network, and the electronic control module being in communication with the data network.

12. The coffee machine of claim 1, wherein the at least one water line is configured to connect one or more of the following:
an inlet to the at least one syringe pump;
the at least one syringe pump to the in-line heating element; and
the in-line heating element to the group head.

13. The coffee machine of claim 1, wherein the brewing settings are provided by an operator or predetermined based on a brewing profile.

14. The coffee machine of claim 11, wherein the brewing profile includes pre-programmed set points for preparing one or more of the following beverages: espresso, drip coffee, and cold brew.

15. A method for manufacturing a coffee machine, the method comprising:
providing an electronic control module, the electronic control module being configured to receive brewing settings, the brewing settings including at least one flow set point and at least one temperature set point;
providing a portafilter configured to hold coffee;
providing a group head configured to receive the portafilter;
providing at least one water line configured to supply water;
providing at least one syringe pump, the at least one syringe pump being configured to administer predetermined amounts of the water based on predetermined criteria to attain a flow rate according to the at least one flow set point, the flow rate provided by the syringe pump being substantially unaffected by a flow resistance created by the coffee;
providing an in-line heating element, the in-line heating element being configured to control a temperature of the water to attain the at least one temperature set point during an extraction process; and
providing a feedback loop, the feedback loop being configured to provide the temperature to the electronic control module, the electronic control module being further configured to selectively adjust the temperature based on the brewing settings.

16. The method of claim 15, further comprising:
connecting, via the at least one water line, one or more of the following:
an inlet to the syringe pump;
the syringe pump to the in-line heating element; and
the in-line heating element to the group head.

17. The method of claim 15, wherein the providing the least one syringe pump includes providing a plurality of redundant syringe pumps.

18. The method of claim 15, wherein the providing the in-line heating element includes placing the in-line heating element down the stream from the at least one syringe pump.

19. The method of claim 15, wherein the providing the group head includes providing a forward-sliding group head configured to receive the portafilter being moved along a track.

20. A coffee machine comprising:
an electronic control module configured to receive brewing settings, the brewing settings including at least one flow set point and at least one temperature set point;
a portafilter configured to hold coffee;
a group head configured to receive the portafilter;
at least one water line configured to supply water;
at least one syringe pump configured to administer predetermined amounts of the water based on predetermined criteria to attain a flow rate according to the at least one flow set point, the flow rate provided by the syringe pump being substantially unaffected by a flow resistance created by the coffee, wherein the at least one flow set point and the at least one temperature set point vary during the extraction process according to the brewing settings, wherein the at least one flow set point is selected to maintain the at least one temperature set point;

an in-line heating element configured to control a temperature of the water to attain the at least one temperature set point during an extraction process; and a feedback loop configured to provide the temperature to the electronic control module, the electronic control module being further configured to selectively adjust the temperature based on the brewing settings.

* * * * *